United States Patent [19]

Miller

[11] Patent Number: 4,970,380

[45] Date of Patent: Nov. 13, 1990

[54] METHOD FOR OPTICAL CODE PATTERN ENHANCEMENT AND GENERATION

[75] Inventor: Glen E. Miller, Redondo, Wash.

[73] Assignee: The Boeing Company, Seattle, Wash.

[21] Appl. No.: 404,864

[22] Filed: Sep. 8, 1989

[51] Int. Cl.$^5$ .................. G01J 1/32; G01D 5/34; G11B 3/90

[52] U.S. Cl. .................. 250/205; 250/231.13; 369/58; 369/116; 346/108

[58] Field of Search ............ 250/231 SE, 237 G, 205, 250/201, 561, 201.5, 201.1, 231.13, 231.10, 231.18; 219/121.62, 121.68, 121.69, 121.78, 121.81, 121.82, 121.83; 346/108, 76 L; 369/58, 106; 33/706, 707; 356/373, 375

[56] References Cited

U.S. PATENT DOCUMENTS

| | | | |
|---|---|---|---|
| 4,148,065 | 4/1979 | Nakagawa et al. | 219/121.68 |
| 4,182,024 | 1/1980 | Cometta | 219/121.62 |
| 4,406,939 | 9/1983 | Golker | 219/121.68 |
| 4,488,277 | 12/1984 | McFarlane et al. | 369/116 |
| 4,494,226 | 1/1985 | Hazel et al. | 369/58 |
| 4,631,713 | 12/1986 | Romeas et al. | 369/116 |
| 4,679,180 | 7/1987 | Kryder et al. | 369/58 |
| 4,751,377 | 6/1988 | Ishizaka et al. | 250/205 |
| 4,757,196 | 7/1988 | Yamada et al. | 250/231 SE |

FOREIGN PATENT DOCUMENTS

| | | | |
|---|---|---|---|
| 0009101 | 1/1978 | Japan | 369/116 |
| 0080138 | 5/1983 | Japan | 369/116 |

Primary Examiner—David C. Nelms
Assistant Examiner—Michael Messinger
Attorney, Agent, or Firm—Christensen, O'Connor, Johnson & Kindness

[57] ABSTRACT

A technique for trimming or making a position sensor that includes a movable encoder having a track extending along a dimension of the encoder, the track having an optical property that varies with position. The sensor also includes a light source for directing an optical input beam onto the track, such that the encoder responds by producing a modulated beam having an intensity that is a function of the optical property. The intensity of the modulated beam thereby encodes the position of the encoder. The technique of the invention comprises the steps of determining the intensity of the modulated beam with the encoder at a selected position, producing a corresponding measurement signal, and comparing the measurement signal to a predetermined target value. If the difference between the measurement signal and the target value exceeds a tolerance, the optical property at the position is modified, for example using a laser beam to ablate a portion of the track. The determining, comparing, and modifying steps are repeated one or more times for each of a plurality of positions, until all differences are within tolerance. The laser beam may be directed onto the track through an access port from a position external to the encoder, such that the encoder can be trimmed after it is fully assembled.

22 Claims, 4 Drawing Sheets

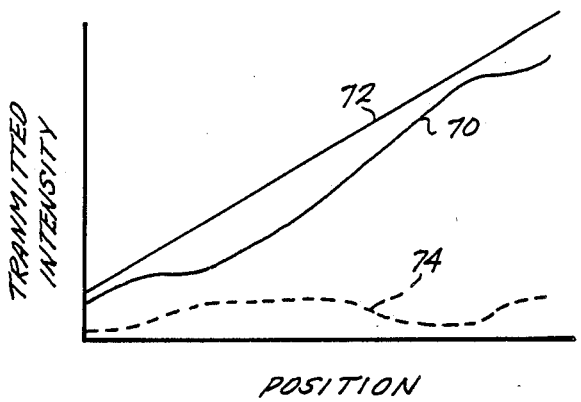
Fig. 4.
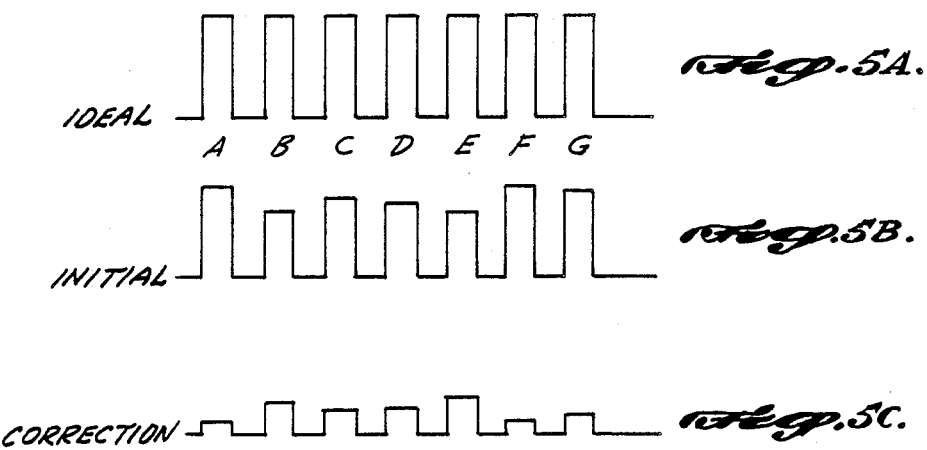
Fig. 5A.
Fig. 5B.
Fig. 5C.

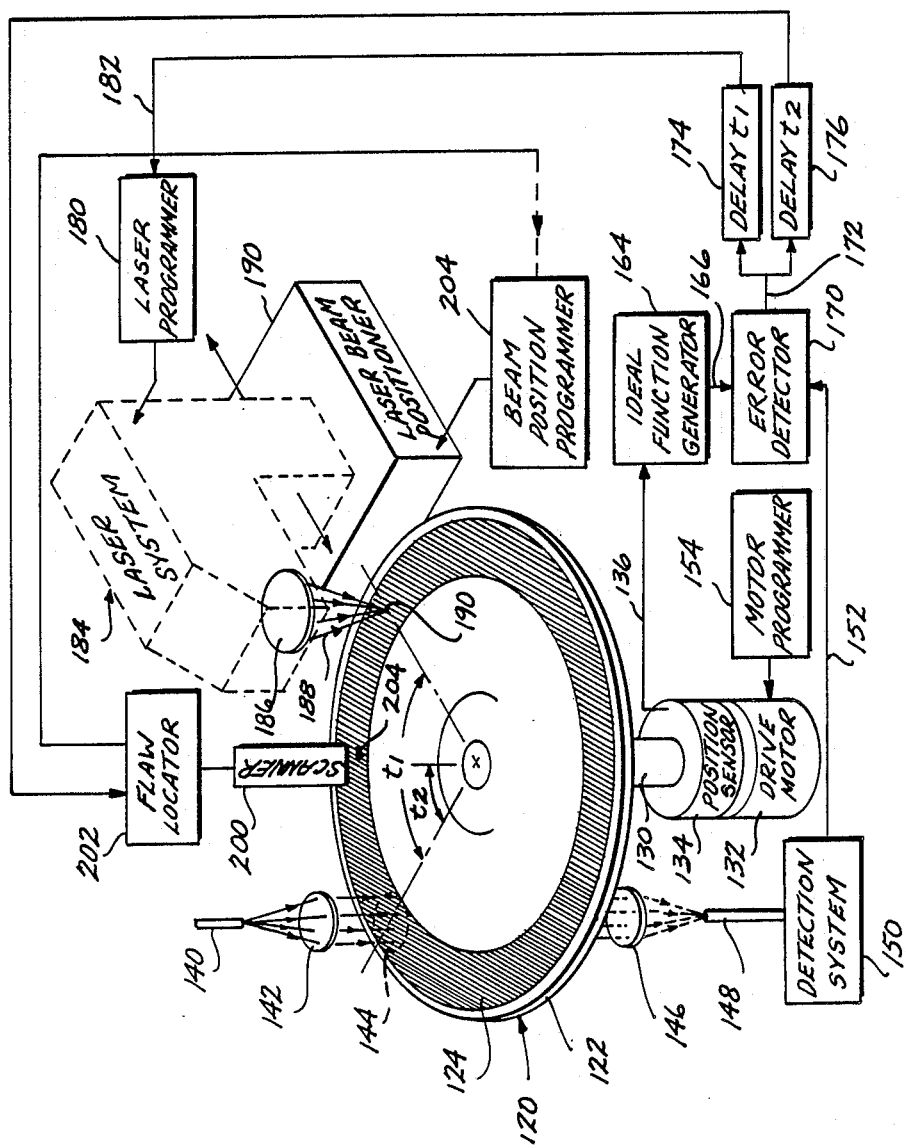

METHOD FOR OPTICAL CODE PATTERN ENHANCEMENT AND GENERATION

FIELD OF THE INVENTION

The present invention relates to optical sensors and, in particular, to optical sensors in which a movable encoder contains a variable code pattern, such that optical interrogation of the encoder can determine the encoder's position.

BACKGROUND OF THE INVENTION

The sensor art includes a wide variety of devices designed to measure the physical position of mechanical elements, and to translate the position information into an electrical signal. Examples include the LVDT (linear variable differential transformer or transducer), the RVDT (rotary variable differential transformer), resolvers, selsyn (self-synchronous) devices, resistive and inductive potentiometers, variometers, and a variety of variable reluctance sensors.

In many applications, there are advantages to be gained from replacing traditional electrical sensors with optical sensors that are totally nonelectrical and that use fiber-optic cables rather than wire for their interconnections. An important advantage of such sensors is that they are immune to the threat of natural and man-made electrical interference. This feature is particularly desirable on aircraft where heavy electrical shielding is normally required to protect the wire interconnections of sensitive electrical sensors from the effects of lightning. A second important advantage is that optical sensors, when fully developed, will be lighter, less costly, and more reliable than their electrical counterparts.

FIG. 1 illustrates an example of an analog optical rotary position sensor, that operates by intensity-modulating a light beam. In this sensor, light radiating from fiber-optic cable 12 is collimated by lens 14, and the collimated beam passes through encoder 16 that includes substrate 18 on which track 20 has been deposited. The encoder is mounted to shaft 22 whose rotational position is to be determined. Track 20 has an optical density that is a function of rotary position around the encoder. The particular function relating position to density may be linear, or have any other prescribed form.

Light passing through the encoder 16 is collected by lens 24 and focused into fiber-optic cable 26. In this example, the light arriving at fiber-optic cable 26 varies in intensity as a function of rotation of the encoder and shaft. The same principle may be applied equally well to a linear position sensor in which the encoder is guided in a straight-line path past the optical system. Similar principles may also be applied to sensors of temperature, pressure, and other physical parameters, if those sensors are made to employ optically readable moving encoders.

FIG. 2 partially illustrates a conventional digital optical rotary position sensor. The sensor includes encoder 30 that comprises substrate 32 having a series of parallel, side-by-side tracks 34C–34G. A corresponding number of fiber-optic cables 36 are positioned with their ends adjacent to the respective tracks, for illuminating the tracks. In a reflective embodiment, the fiber-optic cables also receive the light reflected from the tracks. The tracks consist of alternating reflecting and nonreflecting segments, typically arranged in a Gray code pattern. Encoder 30 moves parallel to the tracks, such that each encoder position produces a unique set of binary digits to the detection system.

As described above, the encoder generally consists of a substrate material upon which a code pattern has been formed. The code pattern may be either analog (as in FIG. 1) or digital (as in FIG. 2), and may be designed to be read optically either by transmitted light or by reflected light. The performance of all optical sensors of this type, whether analog or digital, is sensitive to imperfections in the encoder itself, and in the optical components that are used to read or interpret the code pattern. In an analog sensor, imperfections degrade the measurement accuracy or resolution. In a digital sensor, imperfections frequently cause nonuniform responses from the various tracks, thereby creating a dynamic range problem which increases potential measurement error in the associated electronics.

Typically, the first step in the production of an encoder is the production of artwork for the code pattern, generated either manually or by using computer-aided design techniques. The code pattern is then transferred to a photomask by means of photolithographic techniques. If the pattern is generated oversize to achieve the required accuracy or resolution, it is first photoreduced to the proper size. The substrate is vacuum coated with a contrasting film, usually metallic, and the coated substrate is overcoated with a photoresist, which is then dried and cured. The photomask is then aligned with the substrate, and the photoresist is exposed to light through the photomask. The exposed substrate is then separated from the photomask, and is developed and washed, leaving clear areas where the contrasting coating is to be removed. The contrasting film is removed by chemical etching through the clear areas of the photoresist, and the remaining resist is then removed, leaving the desired contrasting code pattern upon the substrate.

Encoders may also be produced by a "lift-off" process in which resist is first applied to the substrate, and then exposed and developed. The contrasting film is then deposited over the resist. The resist is then lifted off, leaving contrasting film on the substrate in the clear regions of the resist.

The above procedures are complex, and unacceptable pattern imperfections may develop during any one or more of the many steps involved. In addition, the optical system needed to read the pattern will typically contain a number of optical elements (e.g., lenses, gratings, prisms, etc.), each of which can have imperfections that may also degrade the accuracy of the total system. As a result, it has in the past proved quite difficult to produce precision optical position sensors with a high manufacturing yield.

SUMMARY OF THE INVENTION

The present invention provides a technique for trimming a position sensor, particularly after the final assembly of the sensor. The sensor includes a movable encoder having a track extending along a dimension of the encoder. The track has an optical property that varies with position along that dimension. The sensor also includes means for directing an optical input beam onto the track at a selected position along the dimension, such that the encoder responds by producing a modulated beam having an intensity that is a function of the optical property at the selected position. The intensity of the modulated beam thereby encodes the position of the encoder.

A preferred method according to the present invention comprises the steps of determining the intensity of the modulated beam with the encoder at the selected position, producing a corresponding measurement signal, and comparing the measurement signal to a predetermined target value for the selected position. If the difference between the measurement signal and the target value exceeds a predetermined tolerance, the optical property at that position is modified. The determining, comparing, and modifying steps are then repeated one or more times, until the difference between the measurement signal and the target value is within the tolerance. In a preferred embodiment, the track comprises a film positioned on a substrate, and the optical property is modified by ablating the film at selected positions using a laser beam.

Preferably, the encoder is cyclically moved such that the track is cyclically illuminated by th input beam at a plurality of selected positions along the dimension, and the determining, comparing, and modifying steps are repeated for each position. In an apparatus constructed in accordance with the present invention, the encoder includes a frame having an access port therein for permitting a laser beam to be directed through the access port onto the track. Thus the present invention may be used to trim a fully assembled sensor so at to improve its accuracy, and to improve the sensor-to-sensor consistency of a plurality of similar sensors.

BRIEF DESCRIPTION OF THE DRAWINGS

FIG. 4 is a graph illustrating the trimming process for an analog encoder;

FIGS. 5A, 5B and 5C are graphs illustrating the trimming of a digital encoder; and FIG. 6 is a schematic view showing a system for making or trimming a position sensor according to the present invention.

DETAILED DESCRIPTION OF THE INVENTION

The present invention provides a method and apparatus for producing optical position sensors having a high degree of accuracy. In a preferred aspect, the invention is used to trim a fully assembled sensor manufactured by conventional processes, so as to increase the accuracy of the finished product. An example of such an application is illustrated in FIGS. 3-5.

Figure 3:
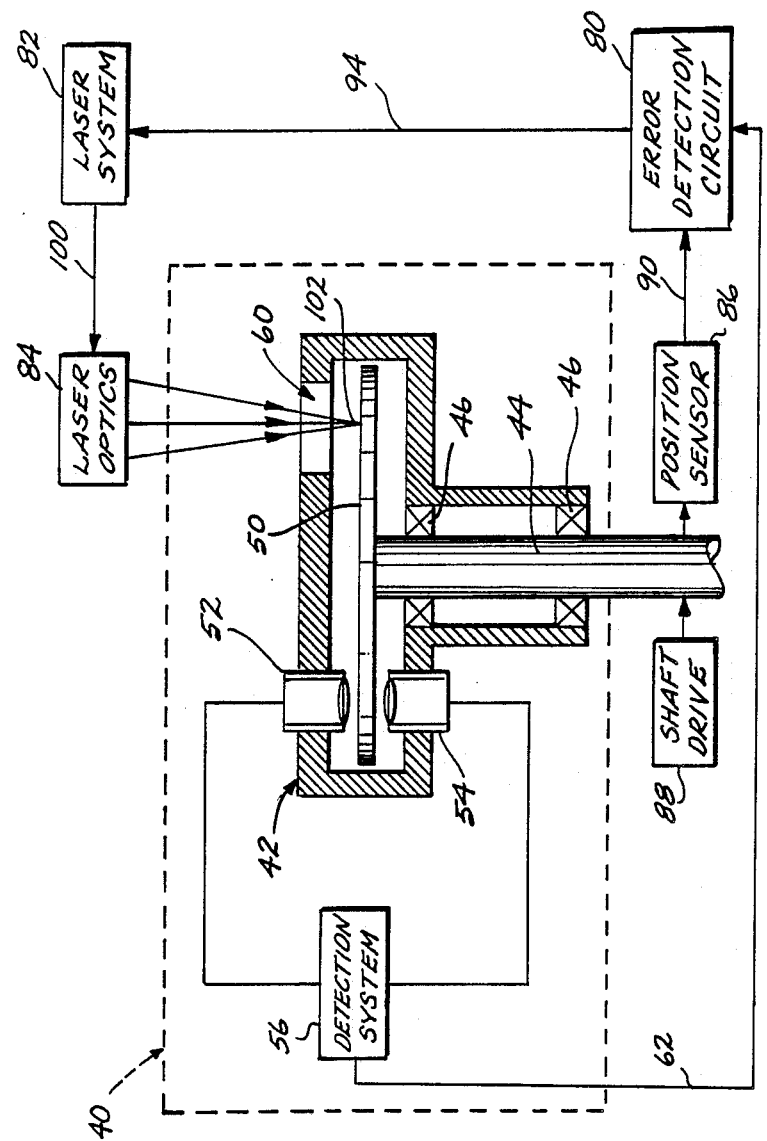
FIG. 3 is a schematic view of an encoder and a system for trimming the encoder.

FIG. 3 illustrates an optical rotary position sensor 40 that comprises housing 42 within which shaft 44 is rotatably mounted by bearings 46. The purpose of the sensor may either be to measure the rotational position of shaft 44, or to measure a parameter that, when varied, causes the shaft to rotate. Disk-shaped encoder 50 is mounted to shaft 44, such that the encoder rotates with the shaft. Sensor 40 further comprises fiber-optic cables 52 and 54, detection system 56, and access port 60 that is used to perform the trimming function, as described below.

Fiber-optic cables 52 and 54 are mounted in housing 42, such that they extend to respective, aligned positions just above and just below encoder 50. Each fiber-optic cable includes a microlens at its tip. Detection system 56 produces an optical signal on fiber-optic cable 52, and the lens at the tip of fiber-optic cable 52 focuses or collimates the optical signal onto encoder 50. The encoder modulates the intensity of the optical signal as a function of the rotational position of the encoder, and produces a modulated, transmitted signal that is picked up by fiber-optic cable 54, and returned to the detection system. The detection system converts the modulated signal into electrical form, and produces a measurement signal on line 62 representing the intensity of the optical signal transmitted by encoder 50. In a reflective system, fiber-optic cables 52 and 54 would have their tips positioned adjacent to one another on one side of the encoder, and detection system 56 would produce a signal representing the intensity of the reflected signal.

The code pattern on a transmissive encoder typically comprises a thin film of a metal, such as nickel or chromium, that has been vacuum deposited upon a transparent (e.g., glass) substrate. For such an encoder, the trimming process of the present invention is preferably accomplished by using a laser beam to selectively vaporize portions of the metal film, to thereby increase the transmissivity of the encoder. Laser systems of this type are known, and are used for example to trim the resistance values of thin film resistors. The transmissivity can also be decreased by exposing a clear area in the code pattern to a laser beam of sufficiently high energy level to etch the substrate material, and thereby cause it to diffuse incident light.

The laser trimming may be performed by a system that in simplified form comprises error detection circuit 80, laser system 82, laser optics 84, position sensor 86 and shaft drive 88. The shaft drive causes shaft 44 to rotate in a predetermined manner, for example at a contact rotation rate. Position sensor 86 measures the shaft rotational position, and provides a corresponding position signal on line 90. As will be apparent below, in producing such position signal, position sensor 86 is, in effect, acting as a precision reference against which the encoder is trimmed.

Error detection circuit 80 receives the position signal on line 90, together with the measurement signal on line 62 representing the intensity transmitted by encoder 50. The error detection circuit preferably compares the measured intensity to an ideal or desired intensity at each encoder position, and produces a corresponding error signal on line 94 representing the difference between the actual and ideal intensities. In response to the error signal, laser system 82 generates a laser beam 100 that is focused by laser optics 84 through access port 60 and onto encoder 50 at focal spot 102. Preferably, the focal spot is very small, such that only a very small area of the track is vaporized or etched during each application of the laser beam. The access port preferably comprises a window substantially transparent to the laser light. The timing of the error signal is delayed such that the laser system generates the laser beam when the position at which the intensity was measured has rotated to a position under access port 60.

Referring to FIG. 4, curve 70 illustrates the actual initial performance of a hypothetical analog position sensor after it has been manufactured by conventional techniques. In particular, curve 70 illustrates the measurement signal produced by detection system 56 plotted against the actual rotational position of the encoder. Curve 72 represents an ideal performance of such a sensor, e.g., a straight line. Curve 74 is the difference between curves 72 and 70, and represents the correction needed to bring the performance of the sensor close to the ideal performance represented by curve 72. FIGS. 5(A)-5(C) show similar graphs for a digital encoder. FIG. 5(A) plots transmitted intensity versus radial position, and represents the ideal performance of the sensor at a rotational position at which all tracks are transmitting. FIG. 5(B) indicates a horizontal actual initial performance of a digital encoder at such a position, and FIG. 5(C) shows the required correction to each track at that position.

In the examples shown in FIG. 4 and 5, the actual transmitted intensity is at all positions less than the ideal at the beginning of the trimming operation, and such sensors can therefore be corrected by selective evaporation of the metal film, as described. For a position sensor in which the transmitted intensity varies in either direction with respect to the ideal, the trimming system could provide a mechanism for decreasing the transmission of the encoder, such as by etching the substrate so that it diffuses the incident optical signal.

In a preferred embodiment, the trimming system of the present invention treats each rotational position as a separate correction problem, and iteratively modifies the optical transmission or reflection of the disk at that position until the resulting measured intensity signal is within a predetermined toleranace of the ideal signal at that position. However, becauae rotation of the encoder disk is required to move a selected position from the measurement station at which its properties are measured (between fiber-optic cables 52 and 54) to the correction station at which it is modified (under access port 60), the correction processes for individual different rotational positions are preferably interleaved. Thus, in such a process, shaft drive 88 causes the encoder to rotate continuously, while detection system 56 produces a series of measurement signals on line 62. Error detection circuit 80 produces an errpor signal for each position, time delays each error signal, and then sends each error signal to the laser system via line 94. The laser system responds by applying the needed correction when that position is under access port 60. When that position subsequently rotates again to the measurement station, the intensity is again measured, and compared to the ideal at the position by the error detection circuit. If a correction is still needed, the error detection circuit again sends a delayed error signal to the laser system, and another correction is made. This process is continued until the intensity signal at each position is within a prescribed tolerance of the ideal intensity. Assuming that the encoder 50 is rotated at a constant rate, the required delay is the same for each position on the encoder disk. Thus the entire encoder may be corrected in a continuous and efficient operation. During such operation, the encoder makes multiple revolutions, until the iteration process is completed at each position.

FIG. 6 provides a more detailed functional block diagram of an apparatus for generating or trimming a code pattern in accordance with the present invention. FIG. 6 shows encoder 120 comprising a transparent substrate 122 and a variably transmissive (analog) track 124 deposited thereon. The encoder is mounted to shaft 130, and the shaft and encoder are rotated by drive motor 132. Position sensor 134 is also coupled to the shaft, and provides a reference position signal on line 136. The sensor produces input illumination light on fiber-optic cable 140 that is collimated by lens 142 such that track 124 is illuminated at measurement position 144. Light passing through the encoder is collected by lens 146 and launched into fiber-optic cable 148. Detection system 150 receives the attenuated optical signal, and produces a measurement signal on line 152 representing transmitted intensity. Drive motor 132 operates under the control of motor programmer 154, the motor programmer causing the shaft and encoder to rotate in a predetermined manner, e.g., at a constant rotation rate.

The reference position signal generated by position sensor 134 on line 136 is received by ideal function generator 164, and the ideal function generator responds by producing an ideal function signal on line 166 that represents the ideal transmission of the encoder at the position represented by the position signal on line 136. Error detector 170 compares the ideal function signal to the measurement signal, and produces an error signal on line 172 representing the difference between these two signals. The error signal is input to adelay circuits 174 and 176 that delay the error signal by times t1 and t2, respectively. The delayed error signal produced by delay circuit 174 is input to laser programmer 180 via line 182. The laser programmer controls laser system 184, the laser system including an output window or port 186 at which a focused laser beam 188 is produced, beam 188 being focused at focal spot 190 on track 124. In response to the delayed error signal on line 182, laser programmer 180 causes layer system 184 to emit a pulse of laser light, such that a small amount of the metallic film of track 124 at focal spot 204 is removed from the encoder. Delay t1 produced by delay circuit 174 corresponds to the time required for an encoder 120 to rotate from measurement position 144 to focal spot 190, thereby coordinating the measurement and trimming operations.

Figure 1:
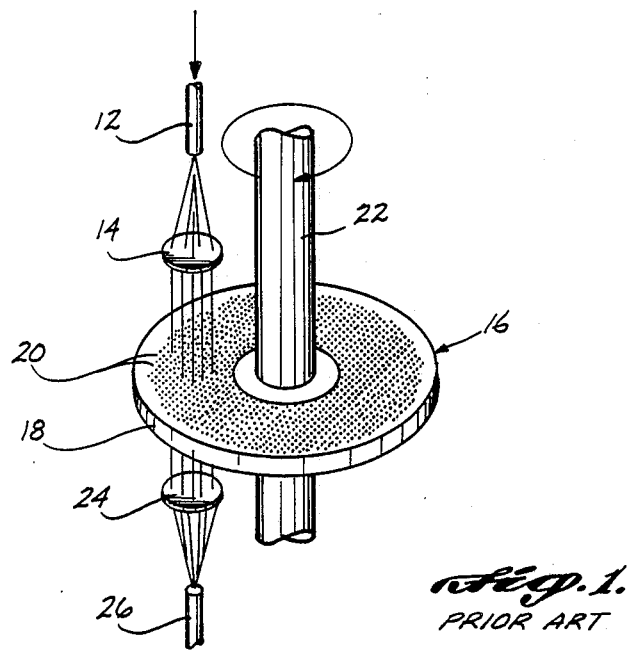
FIG. 1 is a partial, perspective view of a prior art rotary analog encoder.
Figure 2:
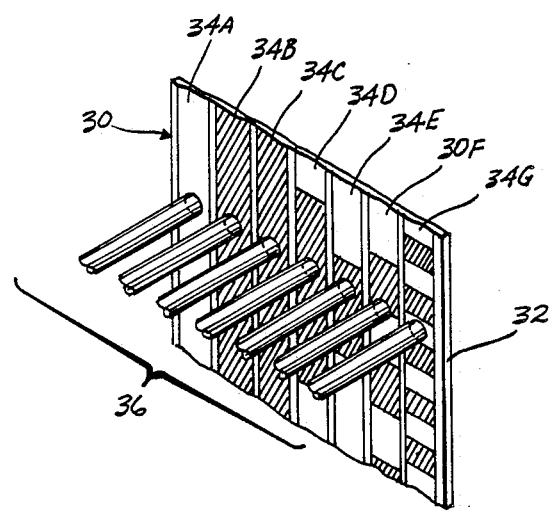
FIG. 2 is a partial, perspective view of a prior art linear digital encoder.

The radial position of focal spot 190 is controlled by laser beam positioner 190 that forms the mounting platform for the laser system. Laser beam positioner 190 is, in turn, controlled by beam position programmer 205. In the case of an analog sensor in which a single code track has the general characteristics of a variable neutral density filter, laser beam positioner 190 may be programmed to correct the code pattern error at a radial location specifically defined or randomly defined, as determined by the exact nature of the code pattern. In the case of a multitrack digital encoder, the optical system at measurement station 144 is replaced by multitrack optics shown in FIG. 2, and laser beam positioner 190 is programmed to position the laser beam at the radial location necessary to correct the errors in each of the individual tracks.

The system shown in FIG. 6 further includes an optical flaw detection system that includes optical scanner 200, flaw locator 202, and delay circuit 176. Scanner 200 optically scans track 124 at detection station 204. Flaw locator 202 processes the information provided by scanner 200, and determines the appropriate radial position at which the encoder should be corrected. Flaw locator 202 also receives the delayed error signal produced by delay circuit 176, the delay t2 corresponding to the time required for a given position on encoder 124 to rotate from measurement station 144 to detection station 204. The flaw locator thereby correlates the image produced by scanner 200 at a given circumferential position with the transmission error signal at that position, and provides an appropriate signal to beam position programmer 205, so as to radially position the laser beam at the desired radial position. The delay required for the encoder to rotate from detection station 204 to focal spot 190 may be produced by the beam position programmer.

While the preferred embodiments of the invention have been illustrated and described, other variations wial be apparent to those skilled in the art. For example, the system of the present invention is entirely application to the generation of a code pattern on an encoder that is intially entirely covered with an opaque film. In addition, although a preferred technique is to completely vaporize the film at a particular point on the encoder, a less powerful laser beam could be used to thin the coating at that point, rather than entirely remove it. Alternately, the film could be thinned over a radial line, rather than at point. Ablating processes other than laser beams may also be used, for example, electrical discharge can be employed to vaporize a portion of a metallic film. Such a process is similar to electrical discharge machining. In such an application, a tungsten wire could be placed close to the surface, and a high voltage placed on the wire to remove a selected portion of the metallic film.

The spots created by the laser or other ablating process should be small enough so that the change in light transmission when the spot enters or leaves the aperture of the measurement system does not cause the output to exceed a specified tolerance. This condition can be expressed by stating that the light transmission curve always stays within some granularity limit. For a process in which it was desired to decrease the transmission of the encoder at a particular position, an ink jet mechanism could be used to add opaque spots to selected positions on the substrate. In such an ink jet process, the process could create the code pattern in its entirety, starting from a blank substrate.

The embodiments of the invention in which an exclusive property or privilege is claimed are defined as follows:

1. A method of making a position sensor, the sensor including a movable encoder having a track extending along a dimension of the encoder, the track having an optical property that varies with position along said dimension, the sensor further including means for directing an optical input beam onto the track at a selected position along said dimension such that the encoder responds to the input beam by producing a modulated beam having an intensity that is a function of the optical property at the selected position, whereby the intensity of the modulated beam encodes the position of the encoder along said dimension, the method comprising:
   (a) determining the intensity of the modulated beam with the encoder at the selected position, and producing a corresponding measurement signal;
   (b) comparing said measurement signal to a predetermined target value for the selected position;
   (c) if the difference between the measurement signal and the target value exceeds a predetermined tolerance, modifying the optical property at said position; and
   (d) repeating steps (a)-(c) until said difference is within said tolerance.

2. The method of claim 1, comprising the further step of cyclically moving the encoder such that the track is cyclically illuminated by the input beam at a plurality of selected positions along said dimension, and wherein steps (a)-(d) are performed for each of said plurality of selected positions.

3. The method of claim 1, wherein the track comprises a film positioned on a substrate, and wherein the modifying step comprises ablating the film.

4. The method of claim 3, wherein the ablating step is performed by directing a laser beam onto the track.

5. The method of claim 3, wherein the ablating is performed by means of an electrical discharge.

6. The method of claim 3, wherein the ablating step comprises completely removing the film at the selected position.

7. The method of claim 3, wherein the ablating step comprises partially removing the film at the selected position.

8. The method of claim 3, wherein the ablating step comprises ablating the film along a line perpendicular to said dimension.

9. The method of claim 3, wherein the ablating step comprises ablating the film at a point on the track.

10. The method of claim 1, wherein the track comprises a film positioned on a substrate, and wherein the modifying step comprises etching the substrate.

11. The method of claim 10, wherein the etching step is performed by directing a laser beam onto the substrate.

12. The method of claim 10, wherein the etching step is performed using an electrical discharge.

13. The method of claim 1, wherein the modifying step comprises depositing material onto the track.

14. The method of claim 13, wherein the depositing step comprises depositing opaque material so as to make the track less transmissive to light.

15. The method of claim 13, wherein the depositing step comprises depositing reflective material.

16. The method of claim 1, wherein the encoder comprises a substrate, wherein the track comprises a code pattern of optical modulation elements formed on the substrate such that the optical property is a function of the fraction of the area of the substrate that contains the modulation elements, and wherein the modifying step comprises modifying one or more of the modulation elements.

17. An apparatus for trimming a sensor, the sensor including a movable encoder having a track extending along a dimension of the encoder, the track having an optical property that varies with position along said dimension, the sensor further comprising means for directing an optical input beam onto the track at a selected position along said dimension such that the encoder responds to the input beam by producing a modulated beam having an intensity that is a function of the optical property at the selected position, whereby the intensity of the modulated beam encodes the position of the encoder along said dimension, the encoder further comprising an acces port through which a light beam may be directed onto the track from a position external to the encoder, and a detection system for determining the intensity of the modulated beam with the encoder at the selected position and producing a corresponding measurement signal, the apparatus comprising:
   (a) means for measuring the encoder position along said dimension and producing a corresponding position signal;
   (b) error detection means connected to receive the position signal and the measurement signal, and including means for producing an error signal corresponding to the difference between the measurement signal and a target value for the selected position; and (c) a laser system including means for producing a laser beam and for directing the laser beam through the access port onto the track when the selected position is adjacent to the access port, such that the laser beam modifies the optical property at said position.

18. The apparatus of claim 17, further comprising iteration means for iteratively producing the measurement signal for the selected position, comparing the measurement signal to the target value, and modifying the optical property, until the difference between the measurement signal and the target value is within a predetermined tolerance.

19. The apparatus of claim 18, further comprising means for cyclically moving the encoder such that the track is cyclically illuminated by the input beam at a plurality of selected positions along said dimension, wherein the iteration means iteratively produces the measurement signal, compares the measurement signal to the target value, and modifies the optical property at each selected position until the difference between the measurement signal for that position and the target value for that position is within said predetermined tolerance.

20. The apparatus of claim 17, wherein the error detection means comprises means for receiving the position signal and generating an ideal function signal corresponding to an ideal value of the measurement signal at the encoder position, and an error detector for producing the error signal as a function of the difference between the measurement signal and said ideal value.

21. The apparatus of claim 17, wherein the laser system includes means for directing the laser beam onto a focal spot on the track and for moving the focal spot in a direction normal to said dimension.

22. A sensor, comprising:
a frame;
an encoder movably mounted within the frame, the encoder having a track extending along a dimension of the encoder, the track having an optical property that varies with position along said dimension;
means for directing an optical input beam onto the track at a selected position along said dimension, such that the encoded responds to the input beam by producing a modulated beam having an intensity that is a function of the optical property at the selected position, whereby the intensity of the modulated beam encodes the position of the encoder along said dimension;
a detection system for determining the intensity of the modulated beam and producing a corresponding measurement signal; and
an access port through which a light beam may be directed onto the track from a position external to the frame, whereby the optical property at the selected position can be modified by directing a laser beam through the access port onto the track.

* * * * *

UNITED STATES PATENT AND TRADEMARK OFFICE
CERTIFICATE OF CORRECTION

PATENT NO. : 4,970,380

DATED : November 13, 1990

INVENTOR(S) : Glen E. Miller

It is certified that error appears in the above-identified patent and that said Letters Patent is hereby corrected as shown below:

| Column | Line | Error |
|---|---|---|
| 1 | 61 | Delete "34C-34G" and insert therefor --34A-34G-- |
| 4 | 36 | Delete "contact" and insert therefor --constant-- |
| 5 | 8 | Delete "horizontal" and insert therefor --hypothetical-- |
| 5 | 12 | Delete "FIG." and insert therefor --FIGURES-- |
| 5 | 27 | Delete "predetermined toleranace" and insert therefor --prescribed tolerance-- |
| 5 | 28 | Delete "becauae" and insert therefor --because-- |
| 6 | 19 | Delete "adelay" and insert therefor --a delay-- |
| 6 | 53 | Delete "optical" and insert therefor --optional-- |
| 7 | 6 | Delete "wial" and insert therefor --will-- |
| 7 | 7 & 8 | Delete "application" and insert therefor --applicable-- |
| 8 | 54 | Delete "acces" and insert therefore --access-- |
| 10 | 16 | Delete "encoded" and insert therefor --encoder-- |

Signed and Sealed this

Seventh Day of April, 1992

Attest:

HARRY F. MANBECK, JR.

*Attesting Officer*     *Commissioner of Patents and Trademarks*